United States Patent [19]  
Mobley et al.

[11] Patent Number: 4,696,849  
[45] Date of Patent: Sep. 29, 1987

[54] PROCESS FOR PREPARING POLYURETHANE-BACKED TEXTILES

[75] Inventors: Larry W. Mobley; Don H. Kelley, both of Lake Jackson, Tex.

[73] Assignee: The Dow Chemical Company, Midland, Mich.

[21] Appl. No.: 776,320

[22] Filed: Sep. 16, 1985

[51] Int. Cl.$^4$ .............................................. B32B 3/00
[52] U.S. Cl. ........................................ 428/95; 428/96; 428/97; 428/219; 428/262; 428/341; 521/86; 521/88; 521/111
[58] Field of Search ............... 428/95, 96, 97, 262, 428/219, 341; 521/86, 88, 111; 524/409

[56] References Cited

U.S. PATENT DOCUMENTS

| | | | |
|---|---|---|---|
| 4,296,159 | 10/1981 | Jenkines et al. | 428/95 |
| 4,515,846 | 5/1985 | McKinney et al. | 428/95 |
| 4,525,405 | 6/1985 | McKinney et al. | 428/95 |

Primary Examiner—Marion C. McCamish

[57] ABSTRACT

This invention is a polyurethane composition useful for backing textiles comprising the catalyzed reaction product of a polyurethane-forming composition which comprises:

(A) a first polyol which comprises a relatively high equivalent weight polyol containing an average of about 1.4–1.95 hydroxyl groups per molecule, of which hydroxyl groups at least 30% are primary hydroxyls or a mixture thereof with at least one additional relatively high equivalent weight polyol containing at least 2.05 hydroxyl groups per molecule, of which at least 30% are primary hydroxyls;

(B) a relatively low equivalent weight compound having about 2 active hydrogen containing moieties per molecule;

(C) a polyisocyanate and (D) a catalytic amount of a catalyst for the reaction of a polyol and a polyisocyanate, wherein the functionalities and proportions of components (A), (B), and (C) are such that such components have an average functionality of about 1.97–2.03, and the composition has an isocyanate index of about 85 to about 125.

This invention is also a textile having attached on one side thereof a adherent polyurethane backing, which backing is prepared from the above-described polyurethane-forming composition.

27 Claims, No Drawings

PROCESS FOR PREPARING POLYURETHANE-BACKED TEXTILES

BACKGROUND OF THE INVENTION

This invention relates to a process for preparing polyurethane-backed textiles.

Polyurethane backings are being increasingly used in preparing carpet and other textiles. The polyurethane backing improves the textile by adding bulk and stiffness, by securing pile fibers to the primary backing of the textile, by increasing the dimensional stability of the textile, and the like. The use of such polyurethane backings is described, for example in U.S. Pat. No. 4,296,159 to Jenkines et al.

The composition of the polyurethane-forming formulation used to prepare the textile backing is determined by at least three competing factors. First, the backed textile must display minimal tendency to curl or otherwise become distorted over time. Second, the backing must be as tack-free as possible, so that the textile does not stick to itself or other materials during storage and use. Third, the backing must strongly adhere to the substrate textile.

It has been found that formulation modifications which improve dimensional stability tend to increase tack and decrease the adhesion of the backing to the textile. Thus, the development of polyurethane textile backings has been characterized by compromising improvement in one of these properties for improvement in another.

In addition to the problems in achieving optimal properties in the backed textile, application of the polyurethane to the textile has also proven difficult. In commercial textile backing operations, there is very little latitude in processing parameters. It has been found, that in these operations, small changes in any number of processing conditions could lead to inferior or unusable product. In particular, small changes in the isocyanate index (100 times the ratio of isocyanate equivalents to active hydrogen equivalents) could cause the production of inferior product. In addition, it has been found that conditions of humidity and moisture absorption by the fibers of the textile have substantial effect on the processing of the polyurethane composition, making the process even more difficult to control. Further, the reactivity of the composition must be carefully controlled to permit the composition to be formed into a layer and gauged to the proper coating weight, yet cure quickly thereafter.

Accordingly, it would be desirable to provide a textile having a polyurethane backing which exhibits excellent dimensional stability, strong bonding to the substrate and low residual tack. In addition, it would be desirable to provide a polyurethane forming composition which is more easily processed than polyurethane forming compositions which are conventionally employed to prepare textile backings and which provides the desired dimensional stability, tack and adhesion.

SUMMARY OF THE INVENTION

In one aspect, this invention is a polyurethane composition useful for backing textiles, which composition comprises the reaction product of a polyurethane-forming composition which comprises:

(A) at least one relatively high equivalent weight polyol containing an average of about 1.4–1.95 hydroxyl groups per molecule, of which hydroxyl groups at least 30% are primary hydroxyls (sometimes referred to herein as a "nominal diol") or a mixture thereof with at least one other relatively high equivalent weight polyol containing an average of at least 2.05 hydroxyl groups per molecule, of which at least 30% are primary hydroxyls;

(B) a relatively low equivalent weight compound having about 2 active hydrogen containing moieties per molecule;

(C) a polyisocyanate and (D) a catalytic amount of a catalyst for the reaction of a polyol and a polyisocyanate, wherein the functionalities and proportions of components (A), (B), and (C) are such that such components have an average functionality of about 1.97–2.03, and the composition has an isocyanate index of about 85 to about 125.

In another aspect, this invention is a textile having attached to one side an adherent polyurethane backing, which backing is prepared by curing the aforementioned polyurethane-forming composition in contact with one side of said textile to form an adherent polyurethane backing thereupon Applicants have found that with the use of a primary hydroxyl-containing polyol, and by strict control of the average functionality of the reactants, a polyurethane textile backing is obtained which provides excellent dimensional stability, very low residual tack and strong adhesion to the textile. In addition, it has been found that the use of the aforementioned composition provides for much greater latitude in processing conditions than previously known compositions. In particular, it has been found that the sensitivity of conventional textile backing compositions to changes in humidity and isocyanate index is substantially reduced with the use of the present composition. Surprisingly, this composition also has desirable curing properties, even though it employs a polyol which is more reactive than those conventionally used.

DETAILED DESCRIPTION OF THE INVENTION

The polyurethane-forming composition employed to form the polyurethane textile backing comprises at least one nominal diol as described hereinafter, a chain extender as described herein and a polyisocyanate. The reactive components in said formulation (by reactive components it is meant all active hydrogen containing materials and polyisocyanates) have an average functionality of about 1.97 to about 2.03, preferably about 1.98 to about 2.02, and more preferably about 1.99 to about 2.01. For the purposes of this invention, "functionality" refers to the number of reactive moieties per molecule For polyisocyanates, the functionality is equal to the number of isocyanate groups per molecule. For polyols and chain extenders, the average functionality is equal to the number of hydroxyl, amine, mercaptan acid or other active hydrogen containing groups per molecule.

The criticality of the average functionality of the reactive components is due, in part, to the fact that commercially available high equivalent weight polyols normally have an actual functionality which is less than their nominal functionality. For example, commercially available polyethers which are nominally "diols" in actuality have a significantly lower functionality, typically from about 1.4 to about 1.95. This difference between nominal and actual functionality is particularly common with polyether polyols, and especially in polymers of propylene oxide and butylene oxide. This difference in functionality has been found to adversely affect the properties of the polyurethane textile backing.

Accordingly, the polyurethane forming composition contains one or more reactive components having an average functionality greater than 2.00 to compensate for the difference in functionality in the nominal diol. The functionality and amount of the reactive component(s) having an average functionality greater than 2.00 are such that the average functionality of all components is within the aforementioned ranges. The polyisocyanate may if desired have a functionality greater than 2.00. It is also possible to employ a low equivalent weight triol or triamine to increase the average functionality of the reactive components. However, it is preferred that the average functionality of the reactive components be increased by using in the composition a relatively high equivalent weight polyol having an average of at least 2.05 hydroxyl groups per molecule, of which at least about 30% are primary hydroxyl groups.

The nominal diol used herein is a material having an average equivalent weight of about 500 to about 5000, preferably about 750 to about 2500 and more preferably about 750 to about 2000. It has a actual functionality of about 1.4 to about 1.95, preferably about 1.6–1.95, and at least about 30%, preferably at least about 50% and more preferably at least about 60% of its hydroxyl groups are primary hydroxyl groups. Although a wide variety of materials can be used, the polyether polyols are preferred on the basis of performance and availability. Polymers of propylene oxide which are at least partially end-capped with ethylene oxide are particularly preferred. Examples of the last materials include VORANOL*-9287, available from The Dow Chemical Company, and Pluronics L-61 available from BASF-Wyandotte.

In a preferred embodiment, an additional polyol having an average of at least 2.05 hydroxyl groups per molecule is used in order to increase the average functionality of the reactive components to the desired range. Except for the higher functionality, the preferred polyol for this purpose is as described with respect to the nominal diol. In particular, at least 30, preferably at least 50% of the hydroxyl groups of the additional polyol are primary hydroxyls. Preferably, this additional polyol has an average functionality of about 2.4 to about 3.0, more preferably about 2.5 to about 2.95. Examples of such preferred additional polyols include VORANOL*-4702, VORANOL*-4701, VORANOL*-4301 all available from The Dow Chemical Company.

When such an additional polyol is employed, it is preferred that it have an equivalent weight which is similar to that of the nominal diol, i.e. their respective equivalent weights differ by about 25% or less.

The nominal diol can be prepared in known manner by reacting an alkylene oxide with a suitable polyhydric initiator compound. The alkylene oxide is preferably a $C_{2-4}$ alkylene oxide, with propylene oxide being preferred. Suitable initiators for the nominal diol include diols such as ethylene glycol, diethylene glycol, propylene glycol, 1,2-butane diol, 1,3-butane diol, 1,4-butane diol, p,p'-isopropylidine diphenol, mixtures thereof and the like. Other compounds having two active hydrogen atoms such as water, methyl amine, ethyl amine, methyldiethanol amine, piperazine and the like can also be used as the initiator compound.

The additional polyol is advantageously prepared in analogous manner using as an initiator a compound having about 3–8, preferably about 3 active hydrogen atoms, such as, for example, glycerine, triethanolamine, diethanolamine, ethanolamine, aminoethylpiperazine and the like.

A relatively low (i.e. 31–250) equivalent weight compound which contains two moieties which contain active hydrogen atoms is used herein as a "chain extender". Suitable as the chain extender are glycols such as ethylene glycol, propylene glycol, 1,3-propane diol, 1,4-butane diol, dipropylene glycol, diethylene glycol, bisisopropyl aniline, triethylene glycol, tetraethylene glycol, tripropylene glycol, tetrapropylene glycol, heptapropylene glycol, mixtures thereof and the like. Diamines, particularly aromatic diamines such as phenylene diamine, toluene diamine, diethyltoluene diamine and the like are also useful. In addition, poly(alkylene oxide) diols having an equivalent weight of about 250 or less can also be used.

The chain extender is generally employed in an amount sufficient to increase the rate of cure of the polyurethane-forming composition and/or to increase the physical properties thereof relative to a similar composition prepared in the absence of the low equivalent weight diol. Generally about 5 to about 50, preferably about 5 to about 30 parts of the chain extender are used per 100 parts of the relatively high equivalent weight polyols (i.e. the nominal diol and additional polyol, if any).

The polyurethane-forming composition further comprises a polyisocyanate. Such polyisocyanate is preferably substantially difunctional but as discussed hereinbefore may have a higher functionality in order that the reactive components together have an average functionality within the ranges described herein. By "substantially difunctional", it is meant that the polyisocyanate has an average functionality of about 1.8 to about 2.1, preferably about 1.95 to about 2.05. The polyisocyanate can be aliphatic or aromatic, but aromatic polyisocyanates are generally preferred on the basis of cost and availability. Suitable polyisocyanates include, for example, 2,4-toluenediisocyanate, xylenediisocyanate, 2,4'- and/or 4,4'-diphenylmethanediisocyanate, p-phenylenediisocyanate, naphthalenediisocyanate, dianisodine diisocyanate, hexamethylene diisocyanate, 1-methyl-2,6-diisocyanatocyclohexane, 1-methyl-2,4-diisocyanatocyclohexane, p,p'-dicyclohexylmethanediisocyanate, mixtures thereof and the like. The 2,4'- and/or 4,4'-diphenylmethanediisocyanate may contain minor amounts of polymeric derivatives thereof as long as the average functionality of the reactive components is within the aforementioned ranges.

Isocyanate-terminated prepolymers and quasi-prepolymers can also be used as the polyisocyanate herein. Such prepolymers are prepared by reacting an excess of a polyisocyanate with a polyol or chain extender as described herein, or with other polyols or chain extenders. In addition, a prepolymer or quasi-prepolymer can be formed for use in this invention by reacting a polyisocyanate with all or a portion of one or more of the nominal diol, additional polyol or chain extender used in the polyurethane forming composition of this invention. This prepolymer or quasi-prepolymer can then be reacted with the remainder of those components to form the desired textile backing. In essence, this last technique involves conducting a two-step, rather than a one-step polymerization reaction.

Also suitable are the corresponding polyisothiocyanates, including isothiocyanate-terminated prepolymers.

The polyisocyanate is employed in an amount sufficient to provide the polyurethane-forming composition with an index of about 85–125. The isocyanate index is 100 times the ratio of isocyanate equivalents to active hydrogen equivalents in the polyurethane-forming composition. An advantage of this invention is that the isocyanate index can be varied to compensate for water which may be absorbed by the textile being coated. In many cases, the textile contains somewhat hygroscopic fibers. The water in these fibers competes with the polyols and chain extender to react with the polyisocyanate, causing a loss in properties. Accordingly, it is preferred to adjust the polyisocyanate index to compensate for the absorbed water, or to adjust the water content of the fiber to a level which permits the use of a desired isocyanate index. Most generally, the textile has a water content of about 0–6, preferably about 2–4 percent by weight. For a textile containing 2 percent water, using a composition with an average functionality of 2.00, an isocyanate index of about 105–112 is preferred, and about 105–110 is especially preferred. Using the same composition, but with 3% water in the textile, a preferred isocyanate index is about 110–120 and about 110–115 is more preferred. Using the same composition, but with 4% water in the textile, a preferred isocyanate index is about 112–125, and a more preferred index is about 113–120. At lower water contents, a lower isocyanate index, i.e. about 100–110 is preferred, and at higher water contents, an even higher isocyanate index is preferred. Within the preferred and more preferred ranges the combination of properties of adhesion to the textile, low tack and high dimensional stability is maximized. As the average functionality of the composition becomes higher or lower than 2.00, the preferred isocyanate index ranges become smaller. When the average functionality of the composition is outside the range of about 1.97–2.03, the processing latitude becomes extremely small. In a preferred embodiment, therefore, the isocyanate index and the water content of the textile being coated are chosen together to achieve the optimal properties in the coated textile. The water content of the textile is readily manipulated by heating, or treating with steam or humid air, if desired.

A catalyst is employed in curing the polyurethane-forming composition. Suitable catalysts include, for example, tertiary amines, organometallic compounds, particularly metal carboxylates, mixtures thereof and the like. Particularly suitable catalysts include, for example, di-n-butyltin bis(mercaptoacetic acid isooctyl ester), dimethyltin dilaurate, dibutyltindilaurate, stannous octoate, lead octoate, ferricacetylacetonate, bismuth carboxylates, triethylenediamine, N-methyl morpholine, mixtures thereof and the like. The catalyst is advantageously employed in an amount such that a relatively rapid cure to a tack-free state is obtained. Preferably, the composition cures from about 0.001 to about 0.5 parts by weight of the organometallic catalysts, and about 0.01 to about 3 parts by weight of the tertiary amine catalysts are typically used per 100 parts of the polyurethane-forming composition.

Other optional materials may also be employed in the polyurethane-forming composition. Although it is preferred that the textile backing be non-cellular, a blowing agent such as water, a low boiling halogenated alkane or an inert gas can be employed if a cellular backing is desired. Frothing techniques such as are described in U.S. Pat. No. 3,821,130 are preferred when a cellular material is desired. In addition, antioxidants, pigments, smoke suppressants, flame suppressing agents such as dibromoneopentyl glycol, decabromodiphenyl oxide, tris(dichloropropyl)phosphate, polyammonium phosphate, beta-chloroethyl phosphonate ester, chlorophosphate ester, polymers and copolymers of vinyl chloride and vinylidene chloride and the like are useful herein.

The polyurethane-forming composition advantageously and preferably contains an inorganic filler, primarily to provide bulk thereto. Suitable such fillers include, for example, milled glass, calcium carbonate, alumina trihydrate, talc, bentonite, antimony trioxide, kaolin, barytes, wollastonite, either as obtained or as treated with fatty acids or organotitanates, mixtures thereof and the like. Such fillers are generally employed in an amount from about 0–500, preferably about 50–400 parts by weight per 100 parts by weight of isocyanate reactive compounds employed in the composition.

In preparing a polyurethane-backed textile, the uncured polyurethane-forming composition is applied to one side of the textile and subsequently cured. The coating may, if desired, be formed into a layer and partially cured before contacted with the textile as long as curing has not progressed to a tack-free state before such contact is made. Application of the polyurethane-forming composition is advantageously performed in a manner which effects sufficient penetration of the composition into the fibers of the textile so that a strong bond is formed on curing. A doctor blade or similar apparatus is suitable for this purpose. The coating weight of the backing is suitably from about 1 to 300, preferably about 10–200, more preferably about 15–100 ounces per square yard. Curing is achieved by heating the coated textile to about 50 to about 150° C. until the polyurethane forming composition is cured to a tack-free state. Heating coils, microwave heaters, infrared lamps, convection areas and the like are suitable to heat the composition to the proper cure temperature.

A wide variety of woven, knitted and other textile can be used in this invention. The textile preferably used herein comprises at least one backing material (a primary) and a pile or facing material which is attached the the backing. The most preferred textiles are floor and wall coverings and carpet or carpet tiles in particular. The preferred carpet comprises a woven or nonwoven primary backing, such as a jute, polypropylene, polyethylene, nylon, polyester, polyacrylate backing, to which is attached on one side a pile. The pile generally comprises yarns such as wool, nylon, polyester, acrylic, cotton, polypropylene, polyethylene, or blends thereof, or similar materials. These yarns are woven or tufted through the primary backing, fusion bonded or otherwise adhered thereto, knitted, or otherwise attached to said primary backing.

The textile may also contain a secondary woven or nonwoven backing material if desired. The use of such secondary backings is known to further improve the dimensional stability of the textile. In addition, the polyurethane backing may itself be overcoated with other polymer layers, particularly a frothed or foamed polyurethane cushion, a microcellular or noncellular polyurethane or rubber (natural or synthetic) backing, a scrim or similar layer.

The following examples are provided to illustrate the invention but are not intended to limit the scope thereof.

All parts and percentages are by weight unless otherwise indicated.

In this Example, Polyol A is a 2000 molecular weight polyether having an average functionality of about 1.94, prepared by reacting dipropylene glycol with propylene oxide to a molecular weight of about 1760, followed by reaction with ethylene oxide to a molecular weight of about 2000. Approximately 65% of the hydroxyl groups in Polyol A are primary hydroxyls.

Polyol B is a 3000 molecular weight polyether having an average functionality of about 2.56, prepared by reacting glycerine with propylene oxide to a molecular weight of about 2750, followed by reaction with ethylene oxide to a molecular weight of about 3000. Approximately 50% of its hydroxyl groups are primary hydroxyl.

In a suitable container are blended 75 grams of polyol A, 10 grams of polyol B, 15 grams of dipropylene glycol, 100 grams alumina trihydrate and 105 grams calcium carbonate. This mixture has an average functionality of 2.00. To this mixture are added about 63 grams of a 4,4'-diphenylmethane diisocyanate prepolymer having an equivalent weight of about 181 (index =110), 1.0 gram of a 2% ferric acetylacetonate solution in a poly(propylene oxide) and 0.005 gram of a dimethyltinbis(mercaptoacetic acid isoctyl ester) catalyst. After thorough mixing, the resulting blend is doctored onto a commercial grade carpet known as Par 22 (a commercial grade level nylon loop carpet having a woven polypropylene primary). The carpet is previously conditioned so that the nylon fibers in the carpet contain 2% by weight water. The coating weight is about 32 ounces/square yard. The coated carpet is cured for six minutes in an oven maintained at 120° C. The resulting carpet is hereinafter designated Sample No. 1.

Sample No. 2 is prepared in like manner except that the carpet is conditioned so that its nylon fibers contain 3% by weight of water. Sample No. 3 is also prepared in like manner, except that the nylon fibers in the carpet contain 4% by weight water.

Comparative Sample Nos. 4 to 6 are prepared in the same manner as Sample Nos. 1 to 3, respectively, except 85 parts of Polyol A and 0 parts Polyol B are used. This polyol mixture has an average functionality of 1.98.

Comparative Sample Nos. 7 to 9 are prepared in the same manner as Sample Nos. 1 to 3, except that 65 parts of Polyol A and 20 parts of Polyol B are used. This polyol mixture has an average functionality of about 2.02.

Each of the Samples and Comparative Samples are evaluated for adhesion to the substrate by measuring, using an Instron tensile tester, the force required to pull one tufted loop from the primary of the control substrate. Results are reported in Table I. All tuft lock results are reported as an average of 3–5 pulls. Higher values indicate superior adhesion.

Dimensional stability is measured by thoroughly wetting a 2"×6" portion of each Sample and Comparative Sample, and holding one end down on a flat surface with the other end free. Edge curl is measured as the rise in centimeters of the free end of each sample from the underlying surface after 2 hours. Low values are preferred.

The tackiness of the coating is measured by placing two portions of the coated carpet back to back, while still hot from curing the backing and compressing them to 60% of their original thickness for 1 hour at 70° C. The force required to separate the two portions is then measured. Low values are preferred.

The results of the evaluation of the Samples and Comparative Sample are as illustrated in Table No. 1.

TABLE No. 1

| Sample No. | 1 | 2 | 3 | 4 | 5 | 6 | 7 | 8 | 9 |
|---|---|---|---|---|---|---|---|---|---|
| Average functionality[1] | 2.00 | 2.00 | 2.00 | 1.98 | 1.98 | 1.98 | 2.02 | 2.02 | 2.02 |
| % moisture in yarns | 2 | 3 | 4 | 2 | 3 | 4 | 2 | 3 | 4 |
| coating weight[2] | 32.0 | 32.0 | 31.6 | 32.0 | 32.0 | 32.7 | 32.5 | 31.7 | 32.6 |
| tuft lock (pounds) | 21.2 | 20.4 | 17.4 | 19.5 | 19.1 | 17.5 | 22.1 | 22.3 | 20.9 |
| edge curl (cm) | 1.9 | 0.8 | 0.5 | 1.5 | 0.3 | 0.2 | 3.8 | 1.5 | 1.3 |
| cohesive bond (pounds) | 1.2 | 2.6 | 2.0 | 4.6 | 2.9 | 2.6 | 0.9 | 0.5 | 1.0 |

[1]Average number of functional groups per molecule of blended Polyol A, Polyol B chain extender, and polyisocyanate.
[2]ounces per square yard The foregoing data illustrates the interdependence of average functionality, isocyanate index and moisture content in the textile. In Sample 2, the isocyanate index is optimized for the moisture content of the textile, and a coated textile having excellent tuft lock, very low tack and very low edge curl is obtained. In Sample 1, a lower water content but identical isocyanate index still provides a coated textile having excellent properties, but the edge curl is slightly higher than in Sample 2. The higher moisture content in Sample 3 causes a significant decrease in tuft lock. This is easily corrected by use of a higher isocyanate index.

In Samples 4–6, the lower functionality makes it harder to optimize the properties of the coated textile at a 110 index. All are marginal in tuft lock, and Sample No. 4 is marginal in cohesive bond (residual tack). In all of these cases, a higher index provides superior properties.

In Samples 8 and 9, excellent properties are obtained at a 110 index. In Sample 7, the edge curl is higher than preferred, but this is easily improved by reducing the isocyanate index.

EXAMPLE 2

A study of the effects of average functionality of the polyurethane-forming composition on processing latitude is conducted by preparing a large sampling of polyurethane-backed textiles using the general procedure described in Example 1. A first set of samples is made using a polyurethane-forming composition having an average functionality of 2.00. In this first set of samples, about one-third are prepared using a textile containing 2% by weight water, one-third are prepared with a textile containing 3% by weight water and the rest are prepared using a textile containing 4% water. At each water content, the isocyanate index is varied in order to determine the range of isocyanate index which could be used to obtain a coated textile having a tuft lock of at least 20 pounds, an edge curl of less than 3 centimeters and a cohesive bond of less than 5 pounds. The study is then repeated using polyurethane-forming compositions having average functionalities of 1.98 and 2.02. The results of this testing are as reported in Table 2 following.

TABLE 2

| Average Functionality | Water Content in Textile | Isocyanate Index |
|---|---|---|
| 2.00 | 2% | 105–112 |
| 2.00 | 3% | 110–120 |
| 2.00 | 4% | 112–125 |
| 1.98 | 2% | 108–112 |
| 1.98 | 3% | 113–120 |
| 1.98 | 4% | 114–125 |
| 2.02 | 2% | 104–108 |
| 2.02 | 3% | 109–112 |
| 2.02 | 4% | 110–114 |

The data in Table 2 illustrate the increase in processing latitude which results from controlling the average functionality of the polyurethane-forming composition. Those samples prepared from a 2.00 functional composition provide desirable properties over a wider isocyanate index range than those prepared using the 1.98 or 2.02 functional compositions. The optimal polyisocyanate index ranges decrease even more as the functionality is further increased or decreased.

The use of secondary hydroxyl-terminated polyethers provides a substantially smaller optimal polyisocyanate index range.

What is claimed is:

1. A polyurethane composition useful for backing textiles, which composition comprises:
    (A) a first polyol which comprises a relatively high equivalent weight polyol containing an average of about 1.4–1.95 hydroxyl groups per molecule, of which hydroxyl groups at least 30% are primary hydroxyls or a mixture thereof with at least one additional relatively high equivalent weight polyol containing at least 2.05 hydroxyl groups per molecule, of which at least 30% are primary hydroxyls;
    (B) a relatively low equivalent weight compound having about 2 active hydrogen containing moieties per molecule;
    (C) a polyisocyanate and
    (D) a catalytic amount of a catalyst for the reaction of a polyol and a polyisocyanate, wherein the functionalities and proportions of components (A), (B), and (C) are such that such components have an average functionality of about 1.97–2.03, and the composition has an isocyanate index of about 85 to about 125.

2. The composition of claim 1 wherein component (A) comprises a poly(propylene oxide) which is at least partially end-capped with ethylene oxide.

3. The composition of claim 2 wherein component (D) comprises 2,4'- and/or 4,4'-diphenylmethanediisocyanate or derivative or prepolymer thereof.

4. The composition of claim 3 wherein component (B) comprises propylene glycol, dipropylene glycol, ethylene glycol or diethylene glycol.

5. The composition of claim 2 wherein said first polyol and said additional polyol, when present, each contain at least 50% primary hydroxyl group 6. The composition of claim 5 wherein said additional polyol is present.

7. The composition of claim 6 which contains, per 100 parts by weight of component (A), 5-10 parts of component (B), and 50-400 parts of component (E) and wherein the isocyanate index is about 100-115.

8. The composition of claim 7 wherein said polyisocyanate comprises 2,4'- and/or 4,4'-diphenylmethanediisocyanate or a derivative or prepolymer thereof.

9. The composition of claim 8 wherein components (A), (B) and (C) have an average functionality of about 1.98–2.02.

10. The composition of claim 10 wherein component (A), (B) and (C) have an average functionality of about 2.00.

11. The composition of claim 2 further comprising (E) an inorganic filler.

12. A textile having an adherent polyurethane backing, said backing being prepared from a polyurethane forming composition which comprises:
    (A) a first polyol which comprises a relatively high equivalent weight polyol containing an average of about 1.4–1.95 hydroxyl groups per molecule, of which hydroxyl groups at least 30% are primary hydroxyls or a mixture thereof with at least one additional relatively high equivalent weight polyol containing at least 2.05 hydroxyl groups per molecule, of which at least 30% are primary hydroxyls;
    (B) a relatively low equivalent weight compound having about 2 active hydrogen containing moieties per molecule;
    (C) a polyisocyanate and
    (D) a catalytic amount of a catalyst for the reaction of a polyol and a polyisocyanate, wherein the functionalities and proportions of components (A), (B), and (C) are such that such components have an average functionality of about 1.97–2.03, and the composition has an isocyanate index of about 85 to about 125.

13. The polyurethane-backed textile of claim 12 wherein said polyurethane backing has a coating weight of about 10–200 ounces per square yard.

14. The polyurethane-backed textile of claim 12 wherein said textile comprises a primary backing material having a pile attached to one side thereof.

15. The polyurethane-backed textile of claim 14 which is a floor covering.

16. The polyurethane-backed textile of claim 12 wherein component (C) comprises 2,4'-and/or 4,4'-diphenylmethanediisocyanate or a derivative or prepolymer thereof.

17. The polyurethane-backed textile of claim 12 wherein component (A) comprises a poly(propylene oxide) which is at least partially end-capped with ethylene oxide.

18. The polyurethane-backed textile composition of claim 17 wherein component (B) comprises propylene glycol, dipropylene glycol, ethylene glycol or diethylene glycol.

19. The polyurethane-backed textile of claim 12 wherein said first polyol and said additional polyol, when present, each contain at least 50% primary hydroxyl group.

20. The polyurethane-backed textile of claim 19 wherein said additional polyol is present.

21. The polyurethane-backed textile of claim 20 which contains, per 100 parts by weight of component (A), 5-10 parts of component (B), and 50-400 parts of component (E) and wherein the isocyanate index is about 100-115.

22. The polyurethane-backed textile of claim 20 wherein the average functionality of components (A), (B) and (C) is about 1.98–2.02.

23. The polyurethane-backed textile of claim 22 wherein the average functionality of components (A), (B) and (C) is about 2.00.

24. The polyurethane-backed textile of claim 23 wherein the textile, prior to coating, has a water content of about 2% by weight and the isocyanate index is about 105–112.

25. The polyurethane-backed textile of claim 24 wherein the textile, prior to coating, has a water content of about 3% by weight and the isocyanate index is about 110–120.

26. The polyurethane-backed textile of claim 24 wherein the textile, prior to coating, has a water content of about 4% by weight and the isocyanate index is about 112–125.

27. The polyurethane-backed textile of claim 12 further comprising (E) an inorganic filler.

* * * * *

UNITED STATES PATENT AND TRADEMARK OFFICE
CERTIFICATE OF CORRECTION

PATENT NO. : 4,696,849

DATED : September 29, 1987

INVENTOR(S) : Larry W. Mobley; Don H. Kelley, both of Lake Jackson, Tex.

It is certified that error appears in the above-identified patent and that said Letters Patent is hereby corrected as shown below:

Column 3, line 24, the word "a" should be --an--.

Column 5, line 60, the word "parts" should be --part--.

Column 6, line 45, the word "the" should be --to--.

Column 9, line 55, "(D)" should be --(C)--.

Column 10, line 8, the word "component" should be --components--.

Column 11, line 8, the number "24" should be --23--.

Column 12, line 3, the number "24" should be --23--.

Column 10, line 8, "Claim 10" should read --Claim 9--.

Signed and Sealed this

Twenty-sixth Day of September, 1989

Attest:

DONALD J. QUIGG

Attesting Officer

Commissioner of Patents and Trademarks